US011947376B2

(12) United States Patent
Yokoyama et al.

(10) Patent No.: US 11,947,376 B2
(45) Date of Patent: Apr. 2, 2024

(54) INPUT DEVICE

(71) Applicant: Alps Alpine Co., Ltd., Tokyo (JP)

(72) Inventors: Tatsuya Yokoyama, Miyagi-ken (JP); Hiroki Utagawa, Miyagi-ken (JP); Kunihiro Kamei, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 278 days.

(21) Appl. No.: 17/492,975

(22) Filed: Oct. 4, 2021

(65) Prior Publication Data

US 2022/0026943 A1 Jan. 27, 2022

Related U.S. Application Data

(63) Continuation of application No. PCT/JP2020/011215, filed on Mar. 13, 2020.

(30) Foreign Application Priority Data

Apr. 24, 2019 (JP) ................................ 2019-082927

(51) Int. Cl.
*G05G 1/02* (2006.01)
*H01H 3/12* (2006.01)
(Continued)

(52) U.S. Cl.
CPC ................ *G05G 1/02* (2013.01); *H01H 3/12* (2013.01); *H01H 3/46* (2013.01); *H01H 13/14* (2013.01);
(Continued)

(58) Field of Classification Search
CPC .. H01H 3/00; H01H 3/02; H01H 3/04; H01H 3/06; H01H 3/12; H01H 3/122;
(Continued)

(56) References Cited

U.S. PATENT DOCUMENTS

| | | | | |
|---|---|---|---|---|
| 9,373,454 | B2 | 6/2016 | Takemae et al. | |
| 2013/0220786 | A1 * | 8/2013 | Niu ........................ | H01H 3/125 200/344 |

FOREIGN PATENT DOCUMENTS

| | | | | |
|---|---|---|---|---|
| CN | 104576134 A * | 4/2015 | ............ | H01H 3/125 |
| JP | 2008-287968 A | 11/2008 | | |
| JP | 2014-216262 A | 11/2014 | | |

OTHER PUBLICATIONS

International Search Report for corresponding International Application No. PCT/JP2020/011215 dated May 26, 2020 (2 pages).

* cited by examiner

*Primary Examiner* — Anthony R Jimenez
(74) *Attorney, Agent, or Firm* — Harness, Dickey & Pierce, P.L.C.

(57) ABSTRACT

An input device includes an operation member vertically movably disposed on a support, urging means for urging the operation member upward, and an inclination preventive member reducing inclination of the operation member by coupling first and second ends of the operation member in a first horizontal direction and linking vertical movements of the first and second ends together. The inclination preventive member includes a main shaft extending in the first horizontal direction and rotatably and axially supported by the support, a pair of arms extending from opposite ends of the main shaft toward an identical side of a second horizontal direction crossing the first horizontal direction, and a pair of secondary shafts extending in the first horizontal direction from distal ends of the pair of arms, and rotatably and axially supported by the first and second ends. The pair of arms include short and long arms.

6 Claims, 10 Drawing Sheets

(51) Int. Cl.
*H01H 3/46* (2006.01)
*H01H 13/14* (2006.01)

(52) U.S. Cl.
CPC . *H01H 2221/058* (2013.01); *H01H 2235/004* (2013.01)

(58) Field of Classification Search
CPC ............ H01H 3/125; H01H 3/32; H01H 3/46; H01H 2221/00; H01H 2221/05; H01H 2221/058; H01H 2235/004; H01H 13/00; H01H 13/14; H01H 13/20; H01H 13/28; H01H 13/50; H01H 13/52; H01H 13/70; H01H 13/7065; G05G 1/00; G05G 1/02
See application file for complete search history.

INPUT DEVICE

CLAIM OF PRIORITY

This application is a Continuation of International Application No. PCT/JP2020/011215 filed on Mar. 13, 2020, which claims benefit of Japanese Patent Application No. 2019-082927 filed on Apr. 24, 2019. The entire contents of each application noted above are hereby incorporated by reference.

BACKGROUND OF THE INVENTION

1. Field of the Invention

The present invention relates to an input device.

2. Description of the Related Art

For example, Japanese Unexamined Patent Application Publication No. 2015-50049 discloses a push switch including a vertically movable operation body. The push switch includes inclination preventive levers each including a pair of first shafts axially supported at opposite ends of the operation body in the longitudinal direction, and a second shaft that extends in the longitudinal direction of the operation body to connect the pair of first shafts to each other.

In this structure, when a first end portion of the operation body is pressed down, the first shaft on the first end of the inclination preventive lever is rotated downward, and, in connection to this rotation, the first shaft on a second end of the inclination preventive lever is rotated downward. Thus, a portion of the operation body on the second end is pressed down to reduce inclination of the operation body.

However, with the technology described in PTL 1, rotation of the inclination preventive lever may be reduced due to causes such as distortion of the inclination preventive lever or backlash of a shaft support portion of the inclination preventive lever, and a rotation angle of the first shaft at the second end of the inclination preventive lever may be reduced further than the rotation angle of the first shaft at the first end of the inclination preventive lever. This may cause inclination of the operation body.

SUMMARY OF THE INVENTION

An input device according to an embodiment includes an operation member vertically movably disposed on a support, urging means for urging the operation member upward, and at least one inclination preventive member that reduces inclination of the operation member by coupling a first end and a second end of the operation member in a first horizontal direction and linking vertical movements of the first end and the second end together. The inclination preventive member includes a main shaft extending in the first horizontal direction and rotatably and axially supported by the support, a pair of arms extending from opposite ends of the main shaft toward an identical side of a second horizontal direction crossing the first horizontal direction, and a pair of secondary shafts extending in the first horizontal direction from distal ends of the pair of arms, and rotatably and axially supported by the first end and the second end of the operation member. The pair of arms include a short arm and a long arm having different lengths.

An embodiment can reduce inclination of an operation member resulting from reduction of a rotation angle of an inclination preventive member.

DESCRIPTION OF THE PREFERRED EMBODIMENTS

First Embodiment

Figure 1:
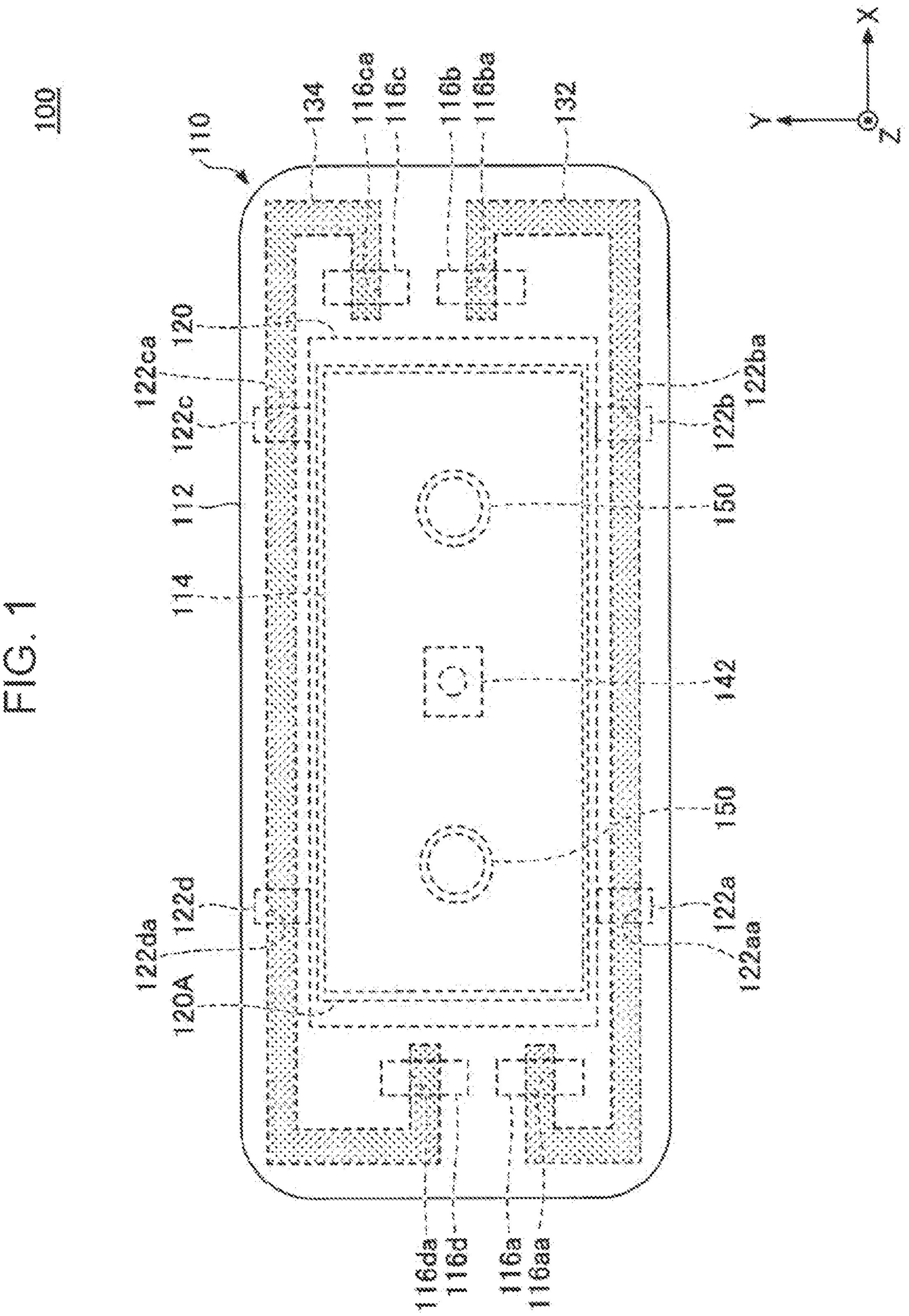
FIG. 1 is a plan view of an input device according to a first embodiment.

A first embodiment will be described below with reference to the drawings. In the following description, for example, a Z-axis positive direction in the drawings indicates upward, and a Z-axis negative direction in the drawings indicates downward. Although the direction perpendicular to the Z-axis is described as a horizontal direction, an arrangement of components, an operation direction, and other details are not limited to those described. Specifically, as long as satisfying the gist of the present invention, relative positional relationship between components arranged, relative operation directions, and other details may be determined as appropriate based on the X-axis, Y-axis, or another direction in the drawings, instead of the Z-axis direction as illustrated in the drawings.

(Structure of Input Device 100)

Figure 2:
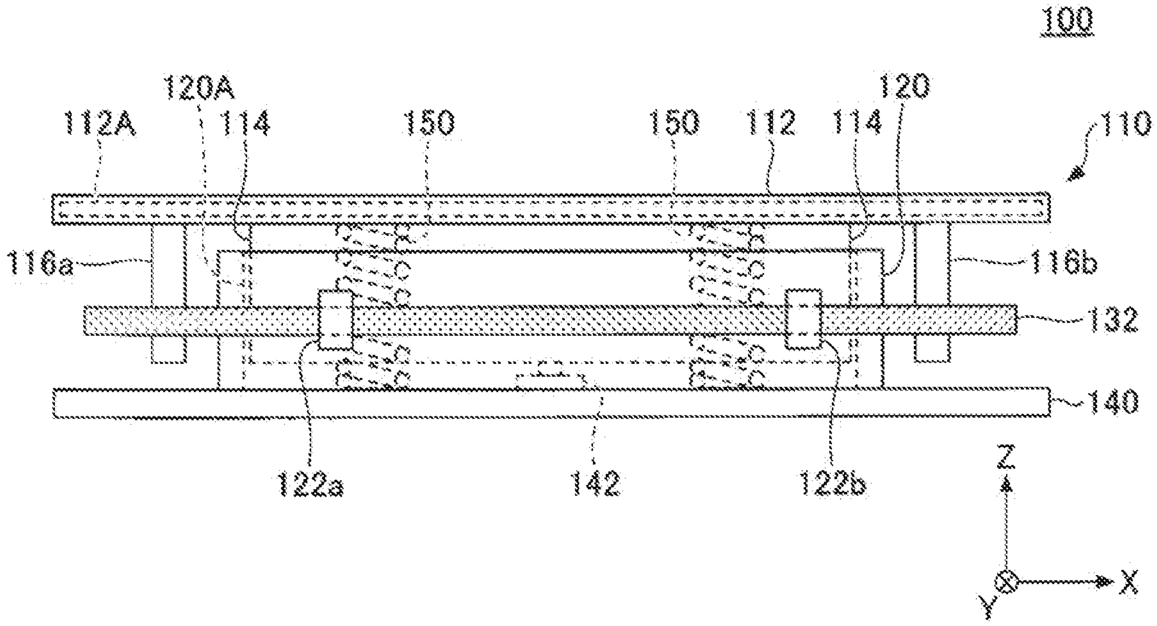
FIG. 2 is a side view of the input device according to the first embodiment.
Figure 3:
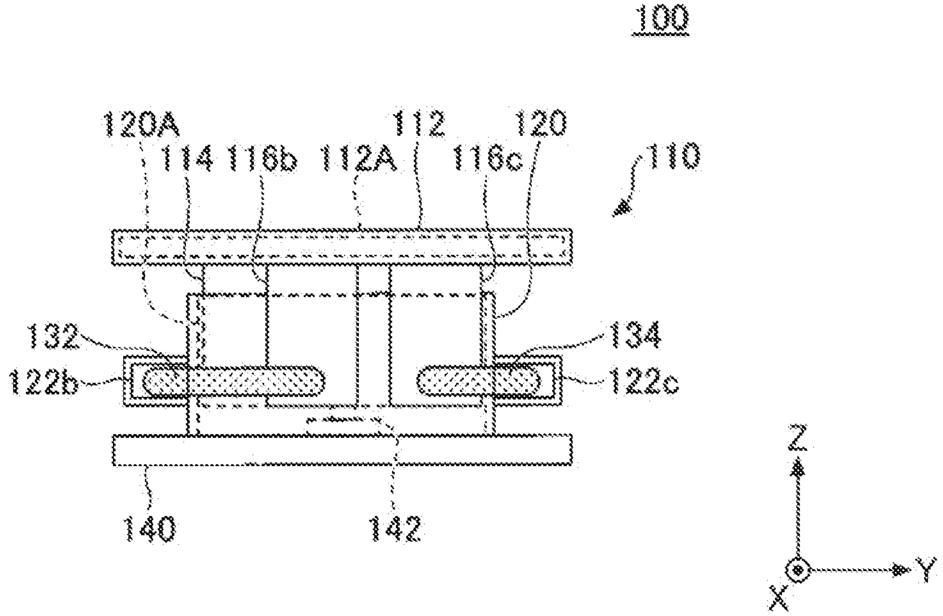
FIG. 3 is a front view of the input device according to the first embodiment.

FIG. 1 is a plan view of an input device 100 according to a first embodiment. FIG. 2 is a side view of the input device 100 according to the first embodiment. FIG. 3 is a front view of the input device 100 according to the first embodiment.

The input device 100 illustrated in FIGS. 1 to 3 is a device used as, for example, an operation panel to control the operation of an electrical component of a vehicle such as an automobile. Besides, the input device 100 is also usable for various other purposes including home appliances and personal digital assistants. The input device 100 can receive a touch operation on an operation surface of an operation member 110, described later, and a press operation on the operation member 110. For example, after selecting the function based on a touch operation on the operation surface of the operation member 110, the input device 100 can determine the function with a push operation on the operation member 110.

As illustrated in FIGS. 1 to 3, the input device 100 includes an operation member 110, a housing 120, a stabilizer 132 (an example of "a first one of a pair of inclination preventive members"), a stabilizer 134 (an example of "a second one of a pair of inclination preventive members"), a circuit board 140, and coil springs 150.

<Operation Member 110>

The operation member 110 receives a push operation on the operation surface (upper surface) from an operator (for example, a finger of a user). The operation member 110 is made of, for example, a synthetic resin material. The operation member 110 is vertically movable with respect to the housing 120. In a top plan view, the operation surface of the operation member 110 has a rectangular shape with a length extending in an X-axis direction (an example of a "first horizontal direction") and a width extending in a Y-axis direction (an example of a "second horizontal direction crossing the first horizontal direction"). The operation member 110 is urged upward by the coil springs 150. The operation member 110 is thus located at a predetermined height position when receiving no push operation from a user. When released from a push operation from the user, the operation member 110 is automatically restored to a predetermined height position.

The operation member 110 includes an operation portion 112 and a slider 114. The operation portion 112 is a substantially flat portion with an upper surface serving as the operation surface. The operation portion 112 includes a built-in touch screen 112A (refer to FIGS. 2 and 3). The touch screen 112A can detect a contact position of the operator on the operation surface, and output a detection signal corresponding to the contact position through a signal line (such as an electric cable or a connector) not illustrated.

The slider 114 has a solid shape (a substantially rectangular parallelepiped with a length extending in the X-axis direction and a width extending in the Y-axis direction) integrated with the operation portion 112 below the operation portion 112. The slider 114 is accommodated in an accommodation space 120A of the housing 120, and vertically slides inside the accommodation space 120A with vertical movements of the operation member 110. When sliding downward in response to the operation member 110 receiving a push operation, the slider 114 can push a push switch 142 mounted on the upper surface of the circuit board 140 below the slider 114.

The operation member 110 includes a bearing 116*a*, a bearing 116*b*, a bearing 116*c*, and a bearing 116*d*.

The bearing 116*a* extends downward from a position on the undersurface of the operation portion 112 on the Y-axis negative side and on the X-axis negative side of the slider 114 (an example of "a first end of the operation member in the first horizontal direction"). The bearing 116*a* rotatably and axially supports, with a bearing hole 116*aa* extending through in the X-axis direction, a secondary shaft 132E (refer to FIG. 4) disposed at a first end of the stabilizer 132 and extending in the X-axis direction.

The bearing 116*b* extends downward from a position on the undersurface of the operation portion 112 on the Y-axis negative side and on the X-axis positive side of the slider 114 (an example of "a second end of the operation member in the first horizontal direction"). The bearing 116*b* rotatably and axially supports, with a bearing hole 116*ba* extending through in the X-axis direction, a secondary shaft 132C (refer to FIG. 4) disposed at a second end of the stabilizer 132 and extending in the X-axis direction. The bearings 116*a* and 116*b* axially support the secondary shafts 132E and 132C of the stabilizer 132 at the same height position.

The bearing 116*c* extends downward from a position on the undersurface of the operation portion 112 on the Y-axis positive side and the X-axis positive side of the slider 114. The bearing 116*c* rotatably and axially supports, with a bearing hole 116*ca* extending through in the X-axis direction, a secondary shaft 134E (refer to FIG. 4) disposed at a first end of the stabilizer 134 and extending in the X-axis direction.

The bearing 116*d* extends downward from a position on the undersurface of the operation portion 112 on the Y-axis positive side and the X-axis negative side of the slider 114. The bearing 116*d* rotatably and axially supports, with a bearing hole 116*da* extending through in the X-axis direction, a secondary shaft 134C (refer to FIG. 4) disposed at a second end of the stabilizer 134 and extending in the X-axis direction. The bearings 116*c* and 116*d* axially support the secondary shafts 134E and 134C of the stabilizer 134 at the same height position.

<Housing 120>

The housing 120 is a tubular portion having the accommodation space 120A with the top and bottom open. The housing 120 is an example of a "support", and supports the operation member 110, the stabilizers 132 and 134, and the circuit board 140. The housing 120 is made of, for example, a synthetic resin material. The slider 114 of the operation member 110 is vertically slidably received in the accommodation space 120A through an upper opening. In a top plan view, the opening of the accommodation space 120A has a substantially the same shape as the profile of the slider 114. For example, in the example illustrated in FIG. 1, the opening of the accommodation space 120A has a rectangular shape with the length extending in the X-axis direction, as in the case of the profile of the slider 114. Thus, the input device 100 according to the present embodiment reduces backlash of the slider 114 in the horizontal direction (the X-axis direction and the Y-axis direction).

The housing 120 includes bearings 122*a*, 122*b*, 122*c*, and 122*d*. The bearings 122*a* and 122*b* protrude from a side surface of the housing 120 on the Y-axis negative side toward the Y-axis negative side, and rotatably and axially support, at bearing holes 122*aa* and 122*ba* extending through in the X-axis direction, a main shaft 132A extending in the X-axis direction and disposed at the center portion of the stabilizer 132. On the side surface of the housing 120 on the Y-axis negative side, the bearing 122*a* is disposed on the X-axis negative side, and the bearing 122*b* is disposed on the X-axis positive side. The bearing holes 122*aa* and 122*ba* are elongated holes slightly longer in the Y-axis direction to allow the main shaft 132A of the stabilizer 132 to move in the Y-axis direction with rotation of the stabilizer 132 (vertical movements of the secondary shafts 132C and 132E). Although not illustrated, the bearing holes 122*aa* and 122*ba* may be openings having a snap-in function on the Y-axis negative side, and may allow the main shaft 132A to be inserted thereinto with a push from the Y-axis negative side.

The bearings 122*c* and 122*d* protrude from a side surface of the housing 120 on the Y-axis positive side toward the Y-axis positive side, and rotatably and axially support, at bearing holes 122*ca* and 122*da* extending through in the X-axis direction, a main shaft 134A extending in the X-axis direction and disposed at the center portion of the stabilizer 134. On the side surface of the housing 120 on the Y-axis positive side, the bearing 122*d* is disposed on the X-axis negative side, and the bearing 122*c* is disposed on the X-axis positive side. The bearings 122*a*, 122*b*, 122*c*, and 122*d* are disposed at the same height position. The bearing holes 122*ca* and 122*da* are elongated holes slightly longer in the Y-axis direction to allow the main shaft 134A of the stabilizer 134 to move in the Y-axis direction with rotation of the stabilizer 134 (vertical movements of the secondary shafts

134C and 134E). Although not illustrated, the bearing holes 122*ca* and 122*da* may be openings having a snap-in function on the Y-axis positive side, and may allow the main shaft 134A to be inserted thereinto with a push from the Y-axis positive side.

<Stabilizers 132 and 134>

The stabilizers 132 and 134 are rod-like members that reduce inclination of the operation member 110 by coupling the first end and the second end of the operation member 110 in the X-axis direction and linking vertical movements of the first end and the second end of the operation member 110 together.

The main shaft 132A (refer to FIG. 4) included in the stabilizer 132 is disposed on the Y-axis negative side of the slider 114 of the operation member 110 to couple the bearing 116*a* disposed at a portion of the operation member 110 on the X-axis negative side and the bearing 116*b* disposed at a portion of the operation member 110 on the X-axis positive side. The stabilizer 132 is axially supported by the bearings 122*a* and 122*b* of the housing 120 to be rotatable and movable in the Y-axis direction.

The main shaft 134A (refer to FIG. 4) included in the stabilizer 134 is disposed on the Y-axis positive side of the slider 114 of the operation member 110 to couple the bearing 116*c* disposed at a portion of the operation member 110 on the X-axis positive side and the bearing 116*d* disposed at a portion of the operation member 110 on the X-axis negative side. The stabilizer 134 is axially supported by the bearings 122*c* and 122*d* of the housing 120 to be rotatable and movable in the Y-axis direction.

For example, the stabilizers 132 and 134 are formed by bending a round-rod-shaped material made of metal. The details of the shape of the stabilizers 132 and 134 will be described later with reference to FIG. 4.

<Circuit Board 140>

The circuit board 140 is a relatively hard, flat member on which various electronic components are mounted. The circuit board 140 is attached to the housing 120 to close the lower opening of the housing 120. An example used as the circuit board 140 is a printed wiring board (PWB). The push switch 142 is mounted at the center of the upper surface of the circuit board 140. The push switch 142 is a so-called metal dome switch. When the push switch 142 is pushed from above by the slider 114 of the operation member 110, an apex of a metal-domed movable contact member (not illustrated) disposed inside is inverted to be switched on. At this time, the push switch 142 can provide clicking tactility to the operation surface of the operation member 110 with the inversion of the movable contact member. When switched on, the push switch 142 can output an on-signal to an external device via a signal line (such as an electric cable and a connector) not illustrated.

<Coil Spring 150>

The coil springs 150 are an example of "urging means". The coil springs 150 are elastically deformably disposed in the vertical direction between the operation member 110 and the circuit board 140. The coil springs 150 urge the operation member 110 upward. Thus, the coil springs 150 allow the operation member 110 to be automatically restored to the predetermined height position when the operation member 110 is released from a push operation.

(Structure of Stabilizers 132 and 134)

Figure 4:
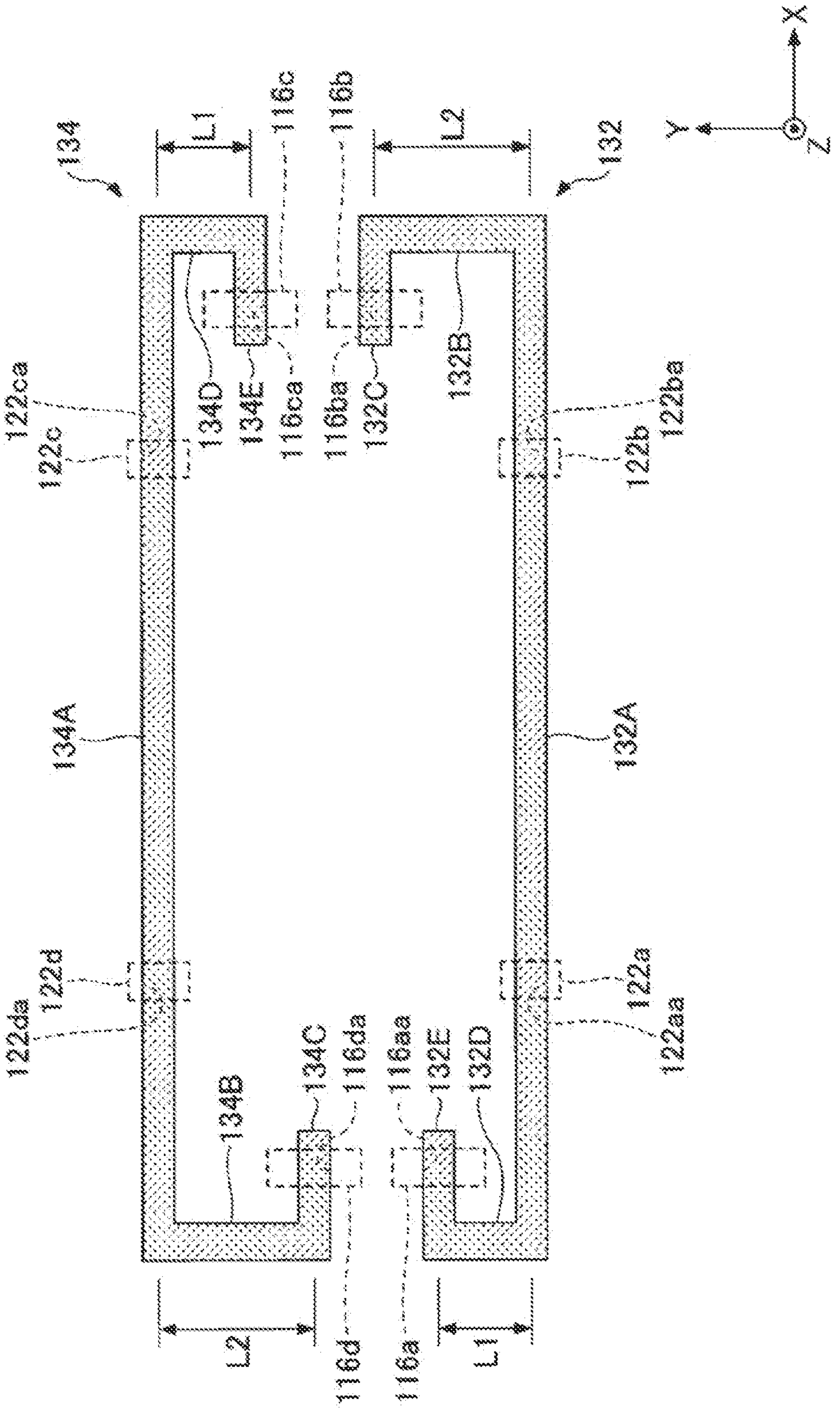
FIG. 4 is a diagram of a structure of stabilizers included in the input device according to the first embodiment.

FIG. 4 is a diagram of a structure of the stabilizers 132 and 134 included in the input device 100 according to the first embodiment.

As illustrated in FIG. 4, the stabilizer 132 includes a main shaft 132A, a long arm 132B, a secondary shaft 132C, a short arm 132D, and a secondary shaft 132E.

The main shaft 132A has a circular cross section, and linearly extends in the X-axis direction (an example of "the first horizontal direction") on the Y-axis negative side of the slider 114 of the operation member 110. The main shaft 132A extends through the bearing holes 122*aa* and 122*ba* of the bearings 122*a* and 122*b* of the housing 120, and is axially supported by the bearings 122*a* and 122*b* to be rotatable and movable in the Y-axis direction.

The long arm 132B linearly extends, from the end of the main shaft 132A on the X-axis positive side, in the Y-axis positive direction (an example of "the same side of the second horizontal direction crossing the first horizontal direction"). The long arm 132B has a length L2.

The secondary shaft 132C has a circular cross section, and linearly extends in the X-axis negative direction from the distal end of the long arm 132B. The secondary shaft 132C extends through the bearing hole 116*ba* of the bearing 116*b* of the operation member 110, and is rotatably and axially supported by the bearing 116*b*.

The short arm 132D linearly extends, from the end of the main shaft 132A on the X-axis negative side, in the Y-axis positive direction (an example of "the same side of the second horizontal direction crossing the first horizontal direction"). The short arm 132D has a length L1 (where L2>L1).

The secondary shaft 132E has a circular cross section, and linearly extends in the X-axis positive direction from the distal end of the short arm 132D. The secondary shaft 132E extends through the bearing hole 116*aa* of the bearing 116*a* of the operation member 110, and is rotatably and axially supported by the bearing 116*a*.

As illustrated in FIG. 4, the stabilizer 134 includes a main shaft 134A, a long arm 134B, a secondary shaft 134C, a short arm 134D, and a secondary shaft 134E.

The main shaft 134A has a circular cross section, and linearly extends in the X-axis direction on the Y-axis positive side of the slider 114 of the operation member 110. The main shaft 134A extends through the bearing holes 122*ca* and 122*da* of the bearings 122*c* and 122*d* of the housing 120, and is axially supported by the bearings 122*c* and 122*d* to be rotatable and movable in the Y-axis direction.

The long arm 134B linearly extends in the Y-axis negative direction from the end of the main shaft 134A on the X-axis negative side. The long arm 132B has the length L2.

The secondary shaft 134C has a circular cross section, and linearly extends in the X-axis positive direction from the distal end of the long arm 134B. The secondary shaft 134C extends through the bearing hole 116*da* of the bearing 116*d* of the operation member 110, and is rotatably and axially supported by the bearing 116*d*.

The short arm 134D linearly extends in the Y-axis negative direction from the end of the main shaft 134A on the X-axis positive side. The short arm 134D has the length L1.

The secondary shaft 134E has a circular cross section, and linearly extends in the X-axis negative direction from the distal end of the short arm 134D. The secondary shaft 134E extends through the bearing hole 116*ca* of the bearing 116*c* of the operation member 110, and is rotatably and axially supported by the bearing 116*c*.

As illustrated in FIGS. 1 and 4, in the input device 100 according to the present embodiment, in a top plan view, the pair of stabilizers 132 and 134 are disposed to have the main shaft 132A and the main shaft 134A arranged parallel to each other with the slider 114 of the operation member 110 interposed therebetween.

Particularly, the input device 100 according to the present embodiment includes, as examples of the pair of stabilizers 132 and 134, two stabilizers having the same shape and each formed by cranking a metal rod with a circular cross section. The stabilizers are arranged while being inverted from each other in the X-axis direction.

Thus, in the input device 100 according to the present embodiment, the long arm 132B of the stabilizer 132 and the short arm 134D of the stabilizer 134 are disposed to oppose each other on the X-axis positive side of the slider 114 of the operation member 110.

In addition, in the input device 100 according to the present embodiment, the short arm 132D of the stabilizer 132 and the long arm 134B of the stabilizer 134 are disposed to oppose each other on the X-axis negative side of the slider 114 of the operation member 110.

(Operation of Input Device 100)

Figure 5A:
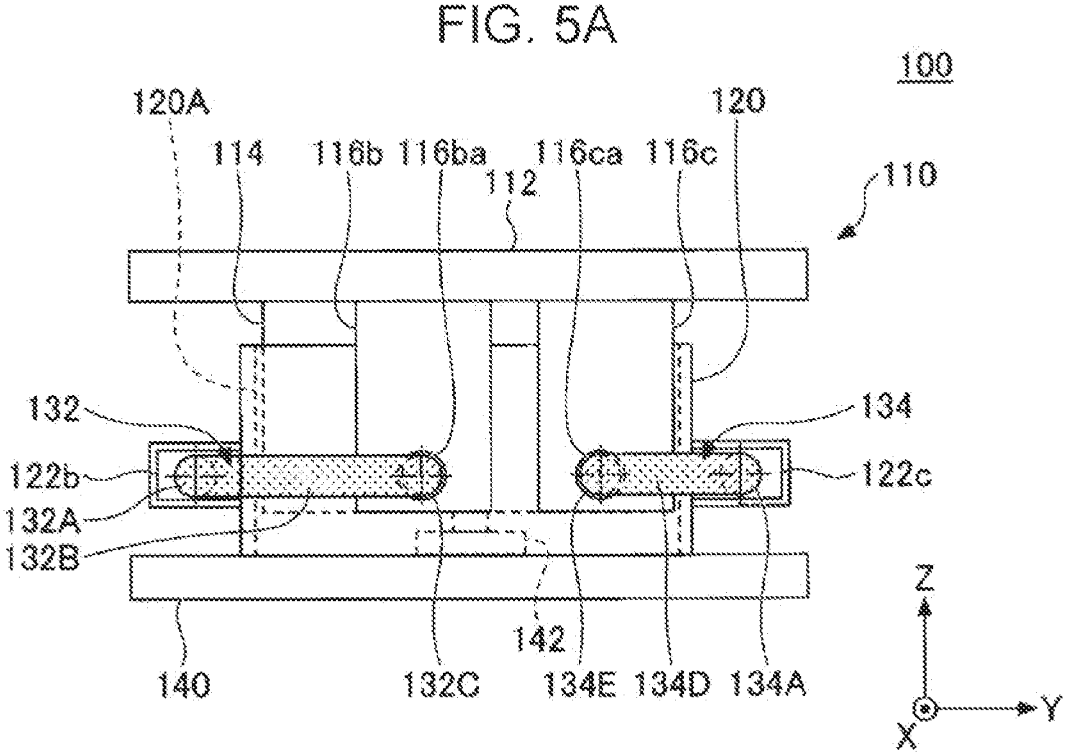
FIGS. 5A and 5B are diagrams of an operation of the input device according to the first embodiment.
Figure 5B:
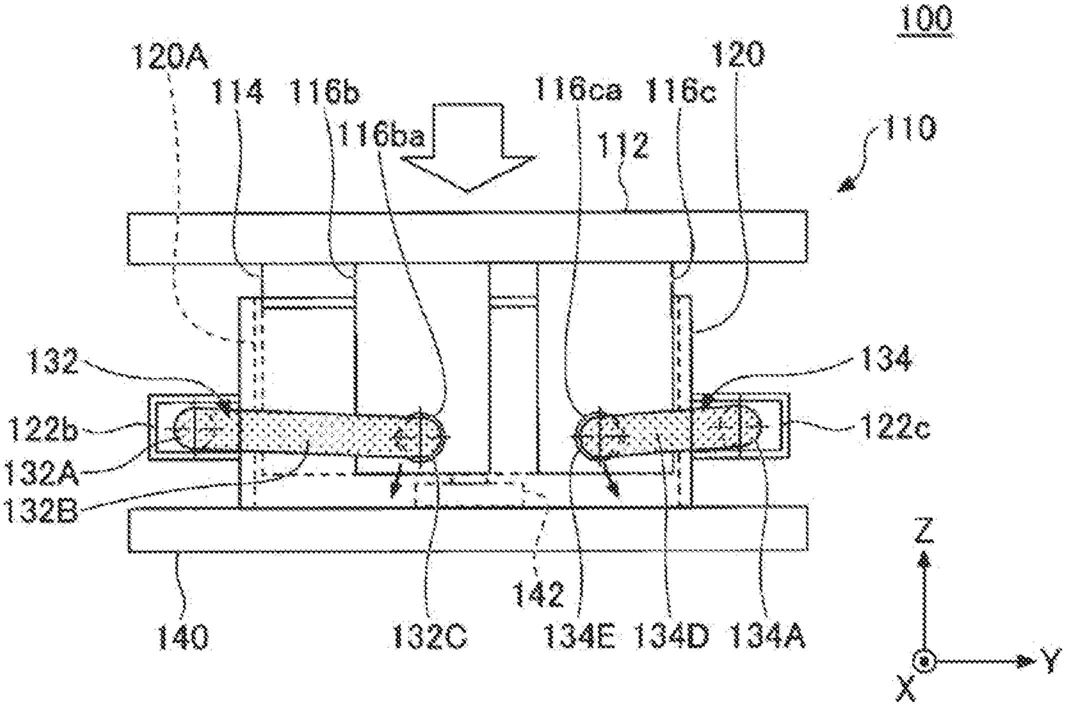

FIGS. 5A and 5B are diagrams illustrating the operation of the input device 100 according to the first embodiment. FIG. 5A illustrates a side surface of the input device 100 on the X-axis positive side in a state where the operation member 110 receives no push operation. FIG. 5B illustrates a side surface of the input device 100 on the X-axis positive side in a state where the operation member 110 has received a push operation.

As illustrated in FIG. 5B, when the operation portion 112 of the operation member 110 receives a downward push operation, the operation member 110 moves downward. At this time, the slider 114 of the operation member 110 slides downward inside the accommodation space 120A, so that the downward movement of the operation member 110 is guided. When the operation member 110 moves downward by a predetermined distance, the slider 114 of the operation member 110 pushes the push switch 142 from above. Thus, the push switch 142 is switched from off to on, and outputs an on-signal to the external device.

When the operation portion 112 of the operation member 110 is released from the push operation, the operation member 110 moves upward with an upward urging force from the coil springs 150, and is automatically restored to the predetermined height position. Thus, the input device 100 is restored to the state illustrated in FIG. 5A. The push switch 142 is switched from on to off, and stops outputting an on-signal to the external device.

As illustrated in FIG. 5B, when the operation member 110 moves downward, on the portion of the operation member 110 on the X-axis positive side, the secondary shaft 132C of the stabilizer 132 is pushed downward by the bearing hole 116*ba* of the bearing 116*b* of the operation member 110. Thus, the stabilizer 132 rotates clockwise when viewed from the X-axis positive side about the axis of the main shaft 132A axially supported by the bearings 122*a* and 122*b* of the housing 120.

Concurrently, the secondary shaft 134E of the stabilizer 134 is pushed downward by the bearing hole 116*ca* of the bearing 116*c* of the operation member 110. Thus, the stabilizer 134 rotates counterclockwise when viewed from the X-axis positive side about the axis of the main shaft 134A axially supported by the bearings 122*c* and 122*d* of the housing 120.

With the rotation of the stabilizer 132, the short arm 132D rotates in the same direction at the opposite end of the stabilizer 132 (on the X-axis negative side), and thus the secondary shaft 132E disposed at the distal end of the short arm 132D pushes down the bearing hole 116*aa* of the bearing 116*a* disposed at a portion of the operation member 110 on the X-axis negative side.

With the rotation of the stabilizer 134, the long arm 134B rotates in the same direction at the opposite end of the stabilizer 134 (on the X-axis negative side), and thus the secondary shaft 134C disposed at the distal end of the long arm 134B pushes down the bearing hole 116*da* of the bearing 116*d* disposed at a portion of the operation member 110 on the X-axis negative side.

Thus, in the input device 100 according to the present embodiment, when the portion of the operation member 110 on the X-axis positive side is pushed down, following the downward movement of the portion of the operation member 110 on the X-axis positive side, the portion of the operation member 110 on the X-axis negative side is also pushed down by the stabilizers 132 and 134 to move downward. Specifically, the portion of the operation member 110 on the X-axis positive side and the portion of the operation member 110 on the X-axis negative side concurrently move downward, and thus inclination of the operation member 110 is reduced.

In the input device 100 according to the present embodiment, the X-axis positive side and the X-axis negative side have point symmetry about the Z-axis that passes the center in a plan view. Thus, in the input device 100 according to the present embodiment, as in the case of the effect exerted when the X-axis positive side is pushed, when the portion of the operation member 110 on the X-axis negative side is pushed down, following the downward movement of the portion of the operation member 110 on the X-axis negative side, the portion of the operation member 110 on the X-axis positive side is also pushed down by the stabilizers 132 and 134 to move downward. Specifically, the portion of the operation member 110 on the X-axis negative side and the portion of the operation member 110 on the X-axis positive side concurrently move downward, and thus, inclination of the operation member 110 is reduced.

(Structure of Reducing Effect Caused by Distortion of Stabilizer 134)

Figure 6A:
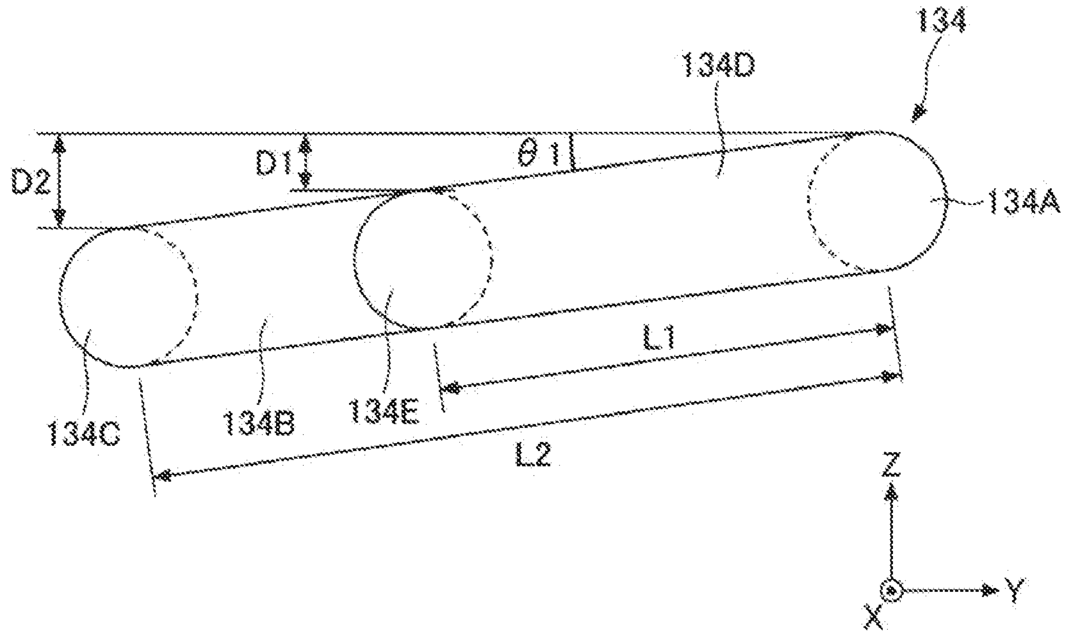
FIGS. 6A and 6B are diagrams illustrating a structure of the input device according to the first embodiment that reduces an effect caused by distortion of a stabilizer.
Figure 6B:
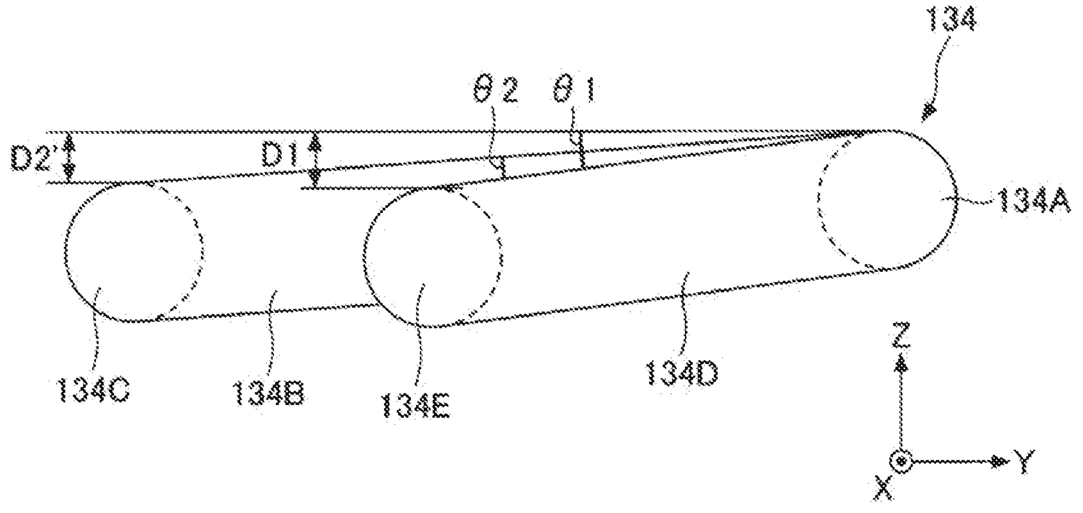

FIGS. 6A and 6B are diagrams illustrating a structure of the input device 100 according to the first embodiment for reducing the effect caused by distortion of the stabilizer 134. FIGS. 6A and 6B illustrate the stabilizer 134 viewed from the X-axis positive side. FIG. 6A illustrates the stabilizer 134 formed from a completely rigid body without distortion. FIG. 6B illustrates the stabilizer 134 with distortion.

For example, when the portion of the operation member 110 on the X-axis positive side is pushed down, as illustrated in FIGS. 6A and 6B, first, the secondary shaft 134E at the end of the stabilizer 134 on the X-axis positive side is pushed down, and thus, the short arm 134D disposed at the end of the stabilizer 134 on the X-axis positive side rotates counterclockwise when viewed from the X-axis positive side. The amount of this downward movement of the secondary shaft 134E is denoted with D1, and the rotation angle of the short arm 134D is denoted with θ1. Concurrently, the main shaft 134A and the long arm 134B of the stabilizer 134 also rotate counterclockwise when viewed from the X-axis positive side.

As illustrated in FIG. 6A, when the stabilizer 134 has no distortion, the rotation angle of the long arm 134B is θ1, which is the same as the rotation angle of the short arm 134D. Here, in the input device 100 according to the present embodiment, as illustrated in FIG. 6A, the length L2 of the long arm 134B is longer than the length L1 of the short arm 134D. Thus, the amount of downward movement D2 of the secondary shaft 134C disposed at the distal end of the long arm 134B is larger than the amount of downward movement D1 of the secondary shaft 134E disposed at the distal end of the short arm 134D.

However, actually, the stabilizer 134 is not a completely rigid body. Thus, as illustrated in FIG. 6B, the stabilizer 134 may be distorted by elastic deformation resulting from the load, the rotation angle of the long arm 134B may run short (the shortage of the rotation angle is denoted with θ2), and the rotation angle of the long arm 134B may fail to reach the rotation angle θ1 of the short arm 134D.

In this case, the amount of downward movement D2 of the secondary shaft 134C is reduced.

In the input device 100 according to the present embodiment, in consideration of this reduction of the amount of movement D2, the length L2 of the long arm 134B is longer than the length L1 of the short arm 134D. Thus, in the input device 100 according to the present embodiment, as illustrated in FIG. 6B, regardless of when the rotation angle of the long arm 134B is reduced with distortion of the stabilizer 134, the amount of downward movement D2 (the amount of movement after reduction is denoted with "D2'" in FIG. 6B) of the secondary shaft 134C disposed at the distal end of the long arm 134B can be equalized with, for example, the amount of downward movement D1 of the secondary shaft 134E disposed at the distal end of the short arm 134D. Specifically, in a structure where the length L2 of the long arm 134B is longer than the length L1 of the short arm 134D, the effect caused by distortion of the stabilizer 134 can be reduced, and the operation member 110 can be moved downward while remaining in a horizontal state.

(Inclination Caused by Backlash of Operation Member 110 in Existing Input Device)

Figure 7A:
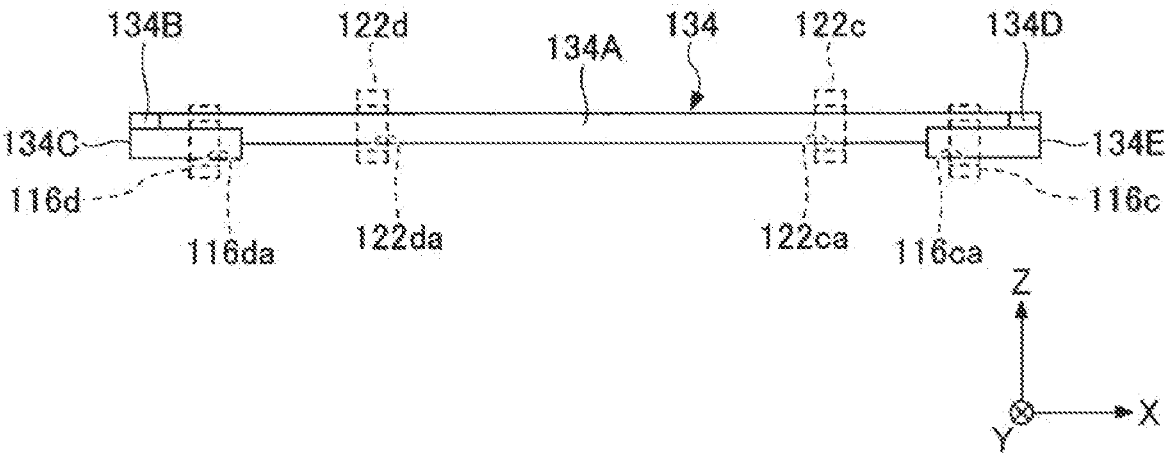
FIGS. 7A and 7B are diagrams illustrating inclination caused by backlash of an operation member in an existing input device.
Figure 7B:
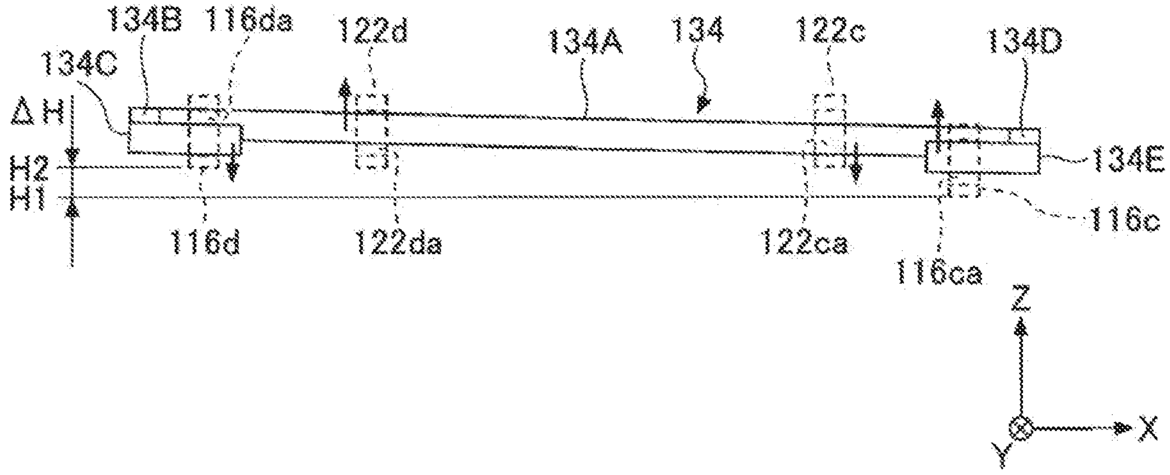

FIGS. 7A and 7B illustrate inclination caused by backlash of the operation member 110 in an existing input device. FIGS. 7A and 7B illustrate an example used as an existing input device where the length L2 of the long arm 134B is equal to the length L1 of the short arm 134D, in comparison with the input device 100 according to the present embodiment.

FIGS. 7A and 7B illustrate the stabilizer 134 viewed from the Y-axis negative side, together with the bearings 122*c* and 122*d* of the housing 120 and the bearings 116*c* and 116*d* of the operation member 110. FIG. 7A illustrates the stabilizer 134 without inclination. FIG. 7B illustrates the stabilizer 134 with inclination.

In the example illustrated in FIG. 7A, a vertical fine gap (backlash) for rotatably holding the main shaft 134A of the stabilizer 134 is left between the main shaft 134A and each of the bearing holes 122*ca* and 122*da* of the bearings 122*c* and 122*d* that axially support the main shaft 134A. In this case, when the portion of the operation member 110 on the X-axis positive side is pushed down, as illustrated in FIG. 7B, the main shaft 134A moves downward inside the bearing hole 122*ca* of the bearing 122*c* on the X-axis positive side, and the main shaft 134A moves upward inside the bearing hole 122*da* of the bearing 122*d* on the X-axis negative side (in other words, the directions in which the stabilizer 134 moves inside the backlash with respect to the bearings 122*c* and 122*d* are vertically opposite from each other between the X-axis positive side and the X-axis negative side). Thus, as illustrated in FIG. 7B, the stabilizer 134 is inclined with respect to the bearings 122*c* and 122*d* (that is, with respect to the housing 120) while having the pushed-down side or the X-axis positive side down.

In the example illustrated in FIG. 7A, a vertical fine gap (backlash) for rotatably holding the secondary shaft 134E or 134C of the stabilizer 134 is left between the secondary shaft 134E or 134C and the bearing hole 116*ca* or 116*da* of the bearing 116*c* or 116*d* that axially supports the secondary shaft 134E or 134C. In this case, when the portion of the operation member 110 on the X-axis positive side is pushed down, as illustrated in FIG. 7B, the secondary shaft 134E moves upward inside the bearing hole 116*ca* of the bearing 116*c* on the X-axis positive side, and the secondary shaft 134C moves downward inside the bearing hole 116*da* of the bearing 116*d* on the X-axis negative side (in other words, the directions in which the stabilizer 134 moves inside the backlash with respect to the bearings 116*c* and 116*d* are vertically opposite from each other between the X-axis positive side and the X-axis negative side). Thus, as illustrated in FIG. 7B, the operation member 110 is inclined with respect to the stabilizer 134 while having the pushed-down side or the X-axis positive side down.

Thus, in the existing input device, as illustrated in FIG. 7B, a difference in height ΔH is left between a height position H1 of the bearing 116*c* at the portion of the operation member 110 on the X-axis positive side and a height position H2 of the bearing 116*d* at the portion of the operation member on the X-axis negative side. This difference in height ΔH inclines the operation member 110 while having the pushed-down side or the X-axis positive side down.

(Structure of Reducing Inclination of Operation Member 110 in Input Device 100)

Figure 8:
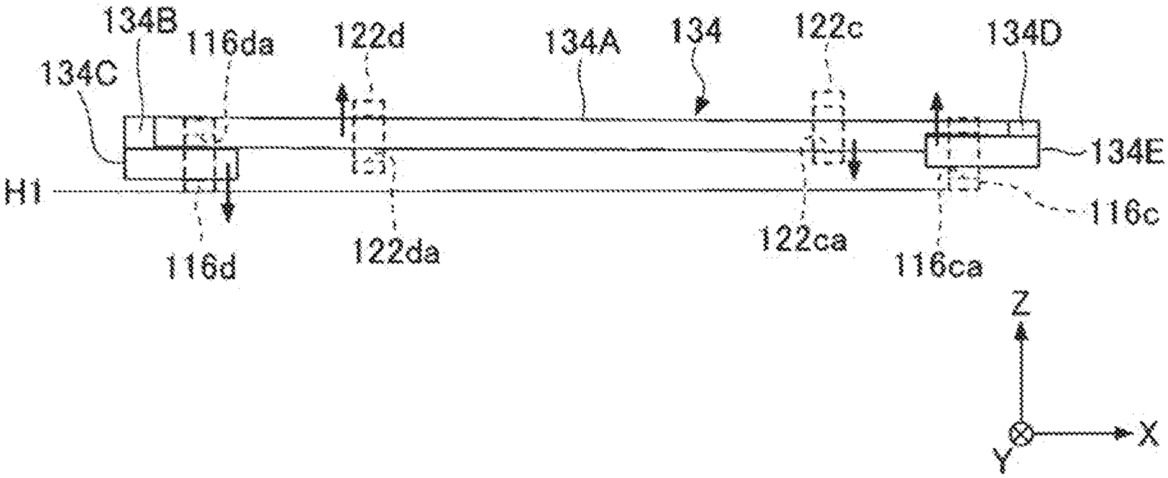
FIG. 8 is a diagram illustrating a structure of the input device according to the first embodiment that reduces inclination of the operation member.

As described above, the operation member 110 inclines due to the effect of distortion of the stabilizer 134 and the effect of backlash of the bearings of the stabilizer 134, and the sum of these effects causes inclination of the operation member 110. Thus, as illustrated in FIG. 8, in the input device 100 according to the present embodiment, the length L2 of the long arm 134B is longer than the length L1 of the short arm 134D to reduce the difference in height ΔH caused by all of these effects. FIG. 8 illustrates a structure of the input device 100 according to the first embodiment for reducing inclination of the operation member 110.

As illustrated in FIG. 8, in the input device 100 according to the present embodiment, regardless of when the effect of distortion of the stabilizer 134 and the effect of backlash of the bearings of the stabilizer 134 occur as a result of the portion of the operation member 110 on the X-axis positive side being pushed down, the length L2 of the long arm 134B is set longer than the length L1 of the short arm 134D in consideration of the difference in height ΔH caused by these effects. Thus, in the input device 100 according to the present embodiment, the height position of the bearing 116*d* of the operation member on the X-axis negative side can be aligned with the height position H1 of the bearing 116*c* of the operation member 110 on the X-axis positive side. Specifically, the operation member 110 can be moved downward while being kept in the horizontal state.

(Preferable Examples of Lengths L1 and L2)

Preferably, the length L2 of the long arms 132B and 134B of the stabilizers 132 and 134 and the length L1 of the short arms 132D and 134D of the stabilizers 132 and 134 satisfy Formula (1) below:

$$L1\times\mathrm{SIN}(\theta1)=L2\times\mathrm{SIN}(\theta1-\theta2)-\Delta H \qquad (1)$$

In Formula (1), the parameters denote as follows.

L1 denotes the length of the short arms 132D and 134D (refer to FIGS. 4, 6A, and 6B).

L2 denotes the length of the long arms 132B and 134B (refer to FIGS. 4, 6A, and 6B)

θ1 denotes the rotation angle of the short arms 132D and 134D of the operation member 110 when the short arms 132D and 134D are pushed down (refer to FIGS. 6A and 6B).

θ2 denotes shortage of the rotation angle of the long arms 132B and 134B with respect to the rotation angle of the short arms 132D and 134D of the operation member 110 caused by distortion of the stabilizers 132 and 134 when the short arms 132D and 134D are pushed down (refer to FIG. 6B).

ΔH denotes the difference in height between the portion of the operation member 110 on the X-axis positive side and the portion of the operation member 110 on the X-axis negative side caused due to backlash of the bearings of the stabilizers 132 and 134 when the short arms 132D and 134D of the operation member 110 are pushed down in a structure where the lengths L1 and L2 are the same (refer to FIG. 7B).

When, for example, θ1=10°, θ2=2°, and ΔH=0.2 mm, preferably, L1=8 mm and L2=11.4 mm based on Formula (1). For example, θ2 may be derived by an actual test or simulation. For example, ΔH may be derived based on a maximum tolerance of each of the shaft support portions of the stabilizers 132 and 134.

Thus, the input device 100 according to the present embodiment can compensate for shortage of the amount of downward movement of the portion of the operation member 110 on the X-axis negative side caused by inclination due to distortion of the stabilizer 134 and backlash of the operation member 110 and the stabilizer 134 when the portion of the operation member 110 on the X-axis positive side is pushed down.

The input device 100 according to the present embodiment includes the pair of stabilizers 132 and 134 arranged while being vertically inverted from each other, and the X-axis positive side and the X-axis negative side have point symmetry about the Z-axis passing the center in a plan view. Regardless of when the portion of the operation member 110 on the X-axis negative side is pushed down, this structure can exert the same effect as that exerted when the portion of the operation member 110 on the X-axis positive side is pushed down.

Specifically, the input device 100 according to the present embodiment can compensate for shortage of the amount of downward movement of the portion of the operation member 110 on the X-axis positive side due to inclination caused by distortion of the stabilizer 132 and backlash of the operation member 110 and the stabilizer 132 when the portion of the operation member 110 on the X-axis negative side is pushed down.

Thus, regardless of whether the portion of the operation member 110 on the X-axis positive side or the X-axis negative side is pushed down, the input device 100 according to the present embodiment allows the operation member 110 to be moved downward in the horizontal state.

Second Embodiment

Figure 9:
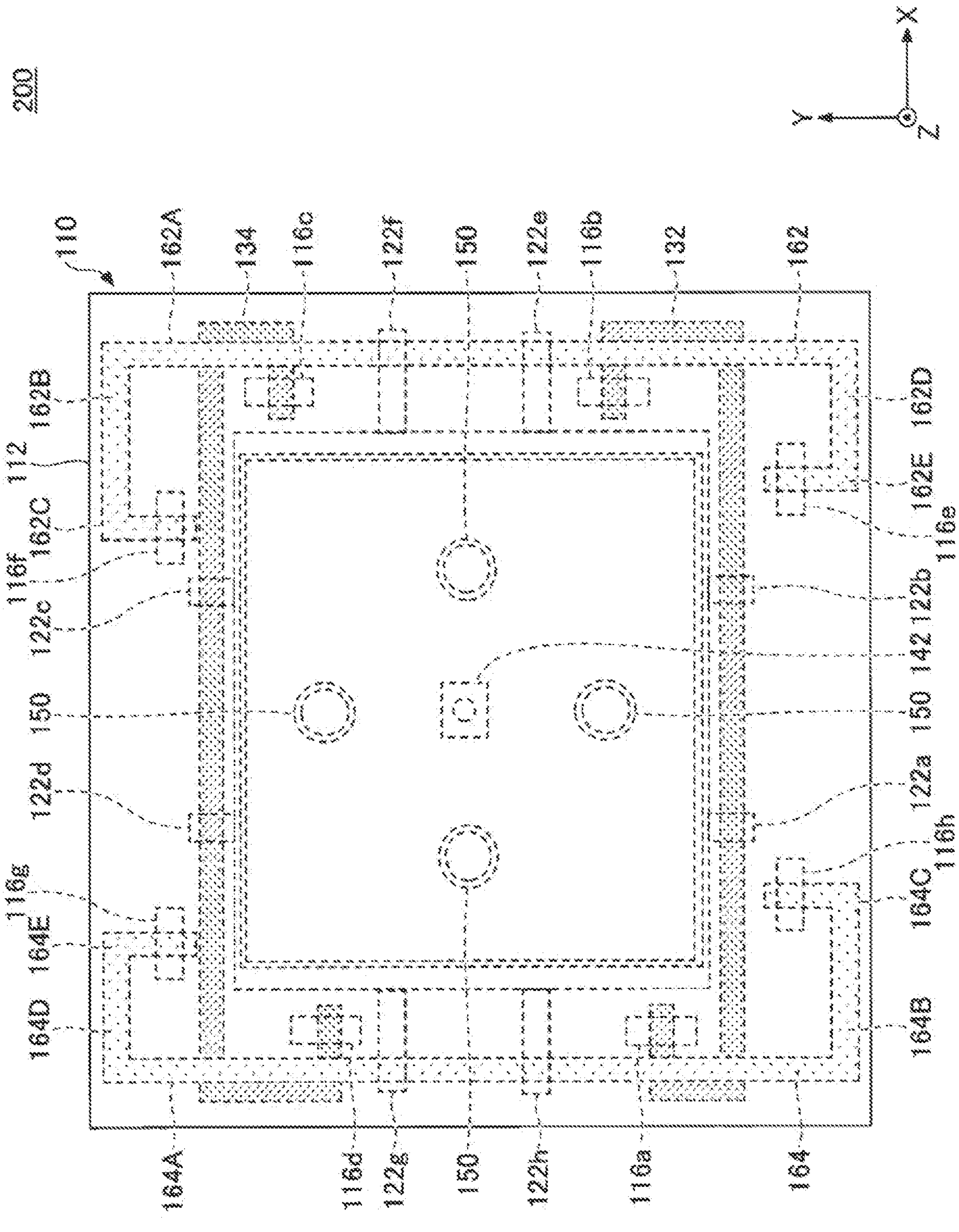
FIG. 9 is a plan view of an input device according to a second embodiment.
Figure 10:
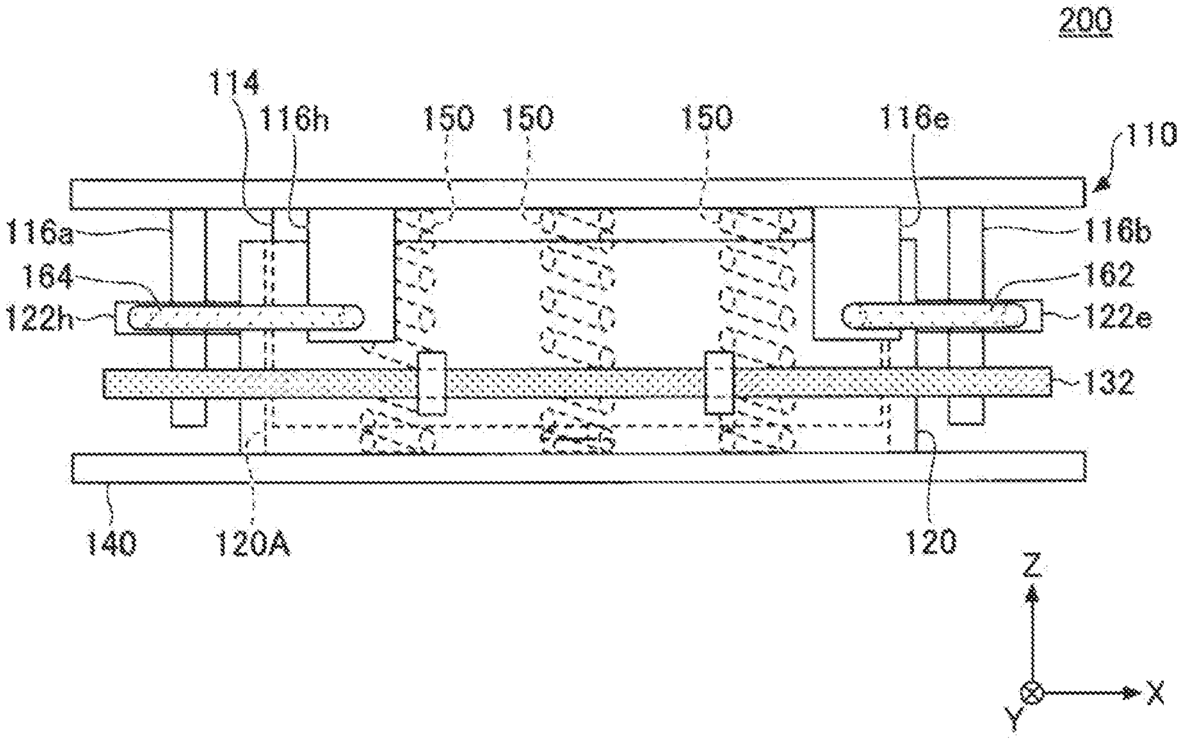
FIG. 10 is a side view of the input device according to the second embodiment.

With reference to FIGS. 9 and 10, a second embodiment will be described. FIG. 9 is a plan view of an input device 200 according to a second embodiment. FIG. 10 is a side view of the input device 200 according to the second embodiment.

As illustrated in FIG. 9, the input device 200 according to the second embodiment differs from the input device 100 according to the first embodiment in that the operation member 110 has substantially a square shape in a top plan view. With this change in shape, the input device 200 according to the second embodiment differs from the input device 100 according to the first embodiment in that the input device 200 includes four coil springs 150 including two arranged in the X direction and two arranged in the Y direction, and includes a pair of stabilizers 162 and 164 in addition to the pair of stabilizers 132 and 134.

As illustrated in FIG. 9, in the input device 200 according to the second embodiment, the pair of stabilizers 132 and 134 and the pair of stabilizers 162 and 164 are arranged to be perpendicular to each other in a top plan view. The pair of stabilizers 162 and 164 and the pair of stabilizers 132 and 134 are formed from the same members.

The pair of stabilizers 162 and 164 function in the same manner as the pair of stabilizers 132 and 134. Thus, the pair of stabilizers 162 and 164 can reduce inclination of the operation member 110 in the Y-axis direction.

More specifically, the stabilizer 162 includes a main shaft 162A on the X-axis positive side of the slider 114 of the operation member 110 to couple a bearing 116*e* disposed at a portion of the operation member 110 on the Y-axis negative side and a bearing 116*f* disposed at a portion of the operation member 110 on the Y-axis positive side. The stabilizer 162 includes the main shaft 162A, a long arm 162B extending toward the X-axis negative side from the end of the main shaft 162A on the Y-axis positive side, a secondary shaft 162C extending toward the Y-axis negative side from the distal end of the long arm 162B, a short arm 162D extending toward the X-axis negative side from the end of the main shaft 162A on the Y-axis negative side, and a secondary shaft 162E extending toward the Y-axis positive side from the distal end of the short arm 162D. The main shaft 162A of the stabilizer 162 is rotatably and axially supported by bearings 122*e* and 122*f* protruding toward the X-axis positive side from the side surface of the housing 120 on the X-axis positive side.

When the portion of the operation member 110 on the Y-axis negative side is pushed down and the secondary shaft 162E is pushed down, the stabilizer 162 rotates counterclockwise when viewed from the Y-axis negative side. Thus, the secondary shaft 162C opposite to the secondary shaft 162E pushes down the portion of the operation member 110 on the Y-axis positive side. Thus, the stabilizer 162 can reduce inclination of the operation member 110 in the Y-axis direction and keep the operation member 110 in the horizontal state.

In the stabilizer 162, the long arm 162B has the length L2. The short arm 162D has the length L1. Thus, when the portion of the operation member 110 on the Y-axis negative side is pushed down, the stabilizer 162 can reduce inclination due to distortion of the stabilizer 162 and backlash of the bearings of the stabilizer 162, and align the height position of the operation member 110 on the Y-axis positive side (closer to the long arm 162B) with the height position of the operation member 110 on the Y-axis negative side (closer to the short arm 162D). Thus, the stabilizer 162 can reduce inclination of the operation member 110 in the Y-axis direction, and keep the operation member 110 in the horizontal state.

The stabilizer 164 includes a main shaft 164A on the X-axis negative side of the slider 114 of the operation member 110 to couple a bearing 116*g* disposed at a portion of the operation member 110 on the Y-axis positive side and a bearing 116*h* disposed at a portion of the operation member 110 on the Y-axis negative side. The stabilizer 164 includes the main shaft 164A, a long arm 164B extending toward the X-axis positive side from the end of the main shaft 164A on the Y-axis negative side, a secondary shaft 164C extending toward the Y-axis positive side from the distal end of the long arm 164B, a short arm 164D extending toward the X-axis positive side from the end of the main shaft 164A on the Y-axis positive side, and a secondary shaft 164E extending toward the Y-axis negative side from the distal end of the short arm 164D. The main shaft 164A of the stabilizer 164 is rotatably and axially supported by bearings 122*g* and 122*h* protruding from the side surface of the housing 120 on the X-axis negative side toward the X-axis negative side.

When the portion of the operation member 110 on the Y-axis positive side is pushed down and the secondary shaft 164E is pushed down, the stabilizer 164 rotates clockwise when viewed from the Y-axis negative side, and thus the secondary shaft 164C opposite to the secondary shaft 164E pushes down the portion of the operation member 110 on the Y-axis negative side. Thus, the stabilizer 164 can reduce inclination of the operation member 110 in the Y-axis direction, and keep the operation member 110 in the horizontal state.

In the stabilizer 164, the long arm 164B has the length L2. The short arm 164D has the length L1. Thus, when the portion of the operation member 110 on the Y-axis positive side is pushed down, the stabilizer 164 can reduce inclination due to distortion of the stabilizer 164 and backlash of the bearings of the stabilizer 164, and align the height position of the operation member 110 on the Y-axis negative side (closer to the long arm 164B) with the height position of the operation member 110 on the Y-axis positive side (closer to the short arm 164D). Thus, the stabilizer 164 can reduce inclination of the operation member 110 in the Y-axis direction, and keep the operation member 110 in the horizontal state.

As described above, the input devices 100 and 200 according to the first and second embodiments each include the operation member 110 vertically movable with respect to the housing 120, the coil springs 150 that urge the operation member 110 upward, and the stabilizers 132 and 134 that reduce inclination of the operation member 110 by coupling opposite ends of the operation member 110 in the X-axis direction and linking vertical movements of the opposite ends together.

Here, the stabilizer 132 includes the main shaft 132A that extends in the X-axis direction and that is rotatably and axially supported by the housing 120, the pair of arms 132B and 132D extending in the Y-axis direction from opposite ends of the main shaft 132A, and the pair of secondary shafts 132C and 132E that extend in the X-axis direction from the distal ends of the pair of arms 132B and 132D and that are rotatably and axially supported by the opposite ends of the operation member 110. The pair of arms 132B and 132D include the short arm 132D and the long arm 132B having different lengths.

In the input devices 100 and 200 according to the first and second embodiments, when the first end portion (a portion closer to the short arm 132D) of the operation member 110 is pushed down, the stabilizer 132 can push down both the first end portion (a portion closer to the short arm 132D) and the second end portion (a portion closer to the long arm 132B) of the operation member 110. Regardless of when the rotation angle of the stabilizer 132 is reduced, the second end portion (a portion closer to the long arm 132B) and the first end portion (a portion closer to the short arm 132D) of the operation member 110 can be pushed down by the same amount. Thus, in the input devices 100 and 200 according to the first and second embodiments, inclination of the operation member 110 due to reduction of the rotation angle of the stabilizer 132 can be reduced.

The stabilizer 134 includes the main shaft 134A that extends in the X-axis direction and that is rotatably and axially supported by the housing 120, the pair of arms 134B and 134D that extend in the Y-axis direction from opposite ends of the main shaft 134A, and the pair of secondary shafts 134C and 134E that extend in the X-axis direction from the distal ends of the pair of arms 134B and 134D and that are rotatably and axially supported by opposite ends of the operation member 110. The pair of arms 134B and 134D include the short arm 134D and the long arm 134B having different lengths.

Thus, in the input devices 100 and 200 according to the first and second embodiments, when the second end portion (a portion closer to the short arm 134D) of the operation member 110 is pushed down, the stabilizer 134 can push down both the second end portion (a portion closer to the short arm 134D) and the first end portion (a portion closer to the long arm 134B) of the operation member 110. Regardless of when the rotation angle of the stabilizer 134 is reduced, the first end portion (a portion closer to the long arm 134B) and the second end portion (a portion closer to the short arm 134D) of the operation member 110 can be pushed down by the same amount. Thus, in the input devices 100 and 200 according to the first and second embodiments, inclination of the operation member 110 due to reduction of the rotation angle of the stabilizer 134 can be reduced.

The input devices 100 and 200 according to the first and second embodiments each include the pair of stabilizers 132 and 134 disposed while having the main shafts 132A and 134A arranged parallel to each other with the operation member 110 interposed therebetween. The long arm 132B of the stabilizer 132 and the short arm 134D of the stabilizer 134 are disposed to oppose each other on the portion of the operation member 110 on the X-axis positive side, and the short arm 132D of the stabilizer 132 and the long arm 134B of the stabilizer 134 are disposed to oppose each other on the portion of the operation member 110 on the X-axis negative side.

Thus, in the input devices 100 and 200 according to the first and second embodiments, regardless of whether the portion of the operation member 110 on the X-axis positive side or the X-axis negative side is pushed down, the portion of the operation member 110 on the X-axis positive side and the X-axis negative side can be pushed down by the same amount. Thus, in the input devices 100 and 200 according to the first and second embodiments, regardless of whether the portion of the operation member 110 on the X-axis positive side or the X-axis negative side is pushed down, inclination of the operation member 110 due to reduction of the rotation angles of the stabilizers 132 and 134 can be reduced.

In the input devices 100 and 200 according to the first and second embodiments, two members with the same shape and arranged while being inverted from each other in the X-axis direction are used as the pair of stabilizers 132 and 134.

Thus, the input devices 100 and 200 according to the first and second embodiments can reduce costs for components by manufacturing common components for the stabilizers 132 and 134. In addition, in the input devices 100 and 200 according to the first and second embodiments, an assembly for the stabilizers 132 and 134 does not involve distinguishment of components for the stabilizers 132 and 134, and thus is facilitated and reliably performed.

In the input device 200 according to the second embodiment, the pair of stabilizers 132 and 134 and the pair of stabilizers 162 and 164 are arranged perpendicular to each other in a plan view.

Thus, in the input device 200 according to the second embodiment, regardless of whether the portion of the operation member 110 on the X-axis positive side, the X-axis negative side, the Y-axis positive side, or the Y-axis negative side is pushed down, inclination of the operation member 110 can be reduced.

The input devices 100 and 200 according to the first and second embodiments satisfy Formula $\{L1 \times SIN(\theta 1) = L2 \times SIN(\theta 1 - \theta 2) - \Delta H\}$.

Here, the parameters denote as follows.

L1 denotes the length of the short arms 132D, 134D, 162D, and 164D.

L2 denotes the length of the long arms 132B, 134B, 162B, and 164B.

θ1 denotes the rotation angle of the short arms 132D, 134D, 162D, and 164D when the portions of the operation member 110 closer to the short arms 132D, 134D, 162D, and 164D are pushed down.

θ2 denotes shortage of the rotation angle of the long arms 132B, 134B, 162B, and 164B with respect to the rotation angle of the short arms 132D, 134D, 162D, and 164D caused by distortion of the stabilizers 132, 134, 162, and 164 when the portions of the operation member 110 closer to the short arms 132D, 134D, 162D, and 164D are pushed down.

ΔH denotes the difference in height between the portion of the operation member 110 on the X-axis positive side and the portion of the operation member 110 on the X-axis negative side and the difference in height between the portion of the operation member 110 on the Y-axis positive side and the portion of the operation member 110 on the Y-axis negative side caused due to backlash of the bearings of the stabilizers 132, 134, 162, and 164 when the portions of the operation member 110 closer to the short arms 132D, 134D, 162D, and 164D are pushed down in a structure where the lengths L1 and L2 are the same.

Thus, in the input devices 100 and 200 according to the first and second embodiments, when the portion of the operation member 110 on the X-axis positive side or the X-axis negative side is pushed down, the portions of the operation member 110 on the X-axis positive side and on the X-axis negative side can be pushed down by the same amount regardless of when the rotation angle of the side of the stabilizers 132 and 134 not pushed is reduced due to distortion of the stabilizers 132 and 134 and backlash of the bearings of the stabilizers 132 and 134. Thus, in the input devices 100 and 200 according to the first and second embodiments, inclination of the operation member 110 due to reduction of the rotation angle of the stabilizers 132 and 134 can be reduced.

In addition, in the input device 200 according to the second embodiment, when the portion of the operation member 110 on the Y-axis positive side or the Y-axis negative side is pushed down, the portions of the operation member 110 on the Y-axis positive side and on the Y-axis negative side can be pushed down by the same amount regardless of when the rotation angle of the side of the stabilizers 162 and 164 not pushed is reduced due to distortion of the stabilizers 162 and 164 and backlash of the bearings of the stabilizers 162 and 164. Thus, in the input device 200 according to the second embodiment, inclination of the operation member 110 due to reduction of the rotation angle of the stabilizers 162 and 164 can be reduced.

Although some embodiments of the present invention have been described in detail above, the present invention is not limited to these embodiments, and can be modified or changed within the scope of the gist of the present invention defined by the scope of claims.

For example, the input device 100 according to the first embodiment includes both of the stabilizers 132 and 134. Instead, the input device 100 according to the first embodiment may include either one of the stabilizers 132 and 134.

The input devices 100 and 200 according to the first and second embodiments include the push switch 142 that detects a push operation on the operation member 110. Instead, the input devices 100 and 200 according to the first and second embodiments may include other detection means configured to detect a push operation on the operation member 110 (such as a photosensor, magnetic sensor, or optical sensor).

What is claimed is:

1. An input device, comprising:

an operation member vertically movably disposed on a support;

urging means for urging the operation member upward; and at least one inclination preventive member that reduces an inclination of the operation member by coupling a first end and a second end of the operation member in a first horizontal direction and linking vertical movements of the first end and the second end together, wherein the at least one inclination preventive member includes a main shaft extending in the first horizontal direction and rotatably and axially supported by the support, a pair of arms extending from opposite ends of the main shaft toward an identical side in a second horizontal direction crossing the first horizontal direction, and a pair of secondary shafts extending in the first horizontal direction from distal ends of the pair of arms, and rotatably and axially supported by the first end and the second end of the operation member, and wherein the pair of arms includes a short arm and a long arm with different lengths.

2. The input device according to claim 1, wherein a length of the short arm and a length of the long arm are determined to satisfy a lengthwise relationship to reduce the inclination of the operation member obtained by adding a first inclination of the operation member caused by a shortage, with respect to an amount of a vertical movement of one of the pair of secondary shafts closer to the short arm when a portion of the operation member closer to the short arm is pushed down, of an amount of a vertical movement of the other of the pair of secondary shafts closer to the long arm resulting from a shortage of a rotation angle of the long arm with respect to a rotation angle of the short arm due to distortion of the at least one inclination preventive member, and a second inclination of the operation member caused by a vertical backlash of a shaft support portion of the at least one inclination preventive member when the portion of the operation member closer to the short arm is pushed down.

3. The input device according to claim 1, wherein a formula $\{L1 \times SIN(\theta 1) = L2 \times SIN(\theta 1 - \theta 2) - \Delta H\}$ is satisfied, where L1 denotes a length of the short arm, L2 denotes a length of the long arm, θ1 denotes a rotation angle of the short arm when a portion of the operation member closer to the short arm is pushed down, θ2 denotes a shortage of a rotation angle of the long arm with respect to the rotation angle of the short arm caused by distortion of the at least one inclination preventive member when the portion of the operation member closer to the short arm is pushed down, and ΔH denotes a difference in height between the portion of the operation member closer to the short arm and a portion of the operation member closer to the long arm, due to a vertical backlash of a shaft support portion of the at least one inclination preventive member when the portion of the operation member closer to the short arm is pushed down.

4. The input device according to claim 1, wherein the at least one inclination preventive member includes at least one pair of inclination preventive members arranged while having the main shafts arranged parallel to each other on both sides in the second horizontal direction of the operation member, wherein at the first end of the operation member, the long arm of a first one of the pair of inclination preventive members and the short arm of a second one of the pair of inclination preventive members are disposed to oppose each other, and wherein at the second end of the operation member, the short arm of the first one of the pair of inclination preventive members and the long arm of the second one of the pair of inclination preventive members are disposed to oppose each other.

5. The input device according to claim 4, wherein two members with an identical shape are used as the pair of inclination preventive members while being inverted from each other in the first horizontal direction.

6. The input device according to claim 4, wherein the at least one pair of inclination preventive members include two pairs of inclination preventive members arranged to be perpendicular to each other in a plan view.

* * * * *